United States Patent
Jange

(10) Patent No.: US 9,636,970 B2
(45) Date of Patent: May 2, 2017

(54) CALCULATION OF FLOW IN AN AIR SYSTEM

(71) Applicant: VOLVO CAR CORPORATION, Gothenburg (SE)

(72) Inventor: Jonas Jange, Kullavik (SE)

(73) Assignee: VOLVO CAR CORPORATION (SE)

(*) Notice: Subject to any disclaimer, the term of this patent is extended or adjusted under 35 U.S.C. 154(b) by 618 days.

(21) Appl. No.: 14/246,409

(22) Filed: Apr. 7, 2014

(65) Prior Publication Data

US 2014/0305626 A1    Oct. 16, 2014

(30) Foreign Application Priority Data

Apr. 15, 2013 (EP) .................................... 13163697

(51) Int. Cl.

| | |
|---|---|
| *G01F 1/00* | (2006.01) |
| *G01F 7/00* | (2006.01) |
| *B60H 1/00* | (2006.01) |
| *G01F 1/34* | (2006.01) |

(Continued)

(52) U.S. Cl.
CPC ..... *B60H 1/00864* (2013.01); *B60H 1/00735* (2013.01); *B60H 1/00828* (2013.01); *B60H 1/00971* (2013.01); *G01F 1/34* (2013.01); *G01F 1/36* (2013.01); *G01F 15/002* (2013.01); *G01F 15/005* (2013.01)

(58) Field of Classification Search
CPC ....... B60K 11/04; B60K 11/08; B60K 11/085; B60K 11/06; B60K 11/02; B60K 13/02; B60K 13/04; B60K 1/04; B60K 2001/005; B60K 2001/008; B62D 35/02; B62D 25/16; B62D 35/00; B62D 37/02; B62D 25/10
See application file for complete search history.

(56) References Cited

U.S. PATENT DOCUMENTS

| | | | |
|---|---|---|---|
| 4,996,849 A | 3/1991 | Burst et al. | |
| 6,330,909 B1* | 12/2001 | Takahashi | B60H 1/005 165/202 |

OTHER PUBLICATIONS

Prof. Dr. R. Cousin, "Berechnung Von Strömungsdruckverlusten Durch Reibung und Wirbelbildung", Strömungstechnik 1 FH-Köln Fachbereich Versorgungstechnik, STRÖ1-KAP5.DOC/02.05.03, BNSDOCID:21 XP_55085970A_1_>, pp. 5-1 thru 5-10.

(Continued)

*Primary Examiner* — Roy Y Yi
(74) *Attorney, Agent, or Firm* — Brooks Kushman P.C.

(57) ABSTRACT

A method is provided for determining an air flow in a vehicle air conditioning system that comprises an inlet; a plurality of outlets; at least one air duct for guiding air from the inlet to the outlets, each air duct being characterized by a predetermined flow resistance coefficient; at least one flap characterized by a flow resistance based on a degree of opening of the flap; and a fan for creating an air flow from the inlet to an outlet. The method comprises determining a total equivalent flow resistance between a predetermined location in the system and an interior of the vehicle, wherein flow resistances are treated as resistances in an electric circuit, and a total equivalent flow resistance is determined. Treating a pressure drop as equivalent with a voltage drop, the air flow can be determined, as the pressure is equal to the resistance times the flow squared.

14 Claims, 4 Drawing Sheets

(51) Int. Cl.
*G01F 15/00* (2006.01)
*G01F 1/36* (2006.01)

(56) References Cited

OTHER PUBLICATIONS

Extended European Search Report Dated Nov. 7, 2013, Application No. 13163697.9-1554, Applicant Volvo Car Corporation, 8 Pages.

\* cited by examiner

CALCULATION OF FLOW IN AN AIR SYSTEM

CROSS-REFERENCE TO RELATED APPLICATIONS

This application claims foreign priority benefits under 35 U.S.C. §119(a)-(d) to European patent application number EP 13163697.9, filed Apr. 15, 2013, which is incorporated by reference in its entirety.

TECHNICAL FIELD

The present disclosure relates to an air system. In particular the present disclosure relates to a method for determining an air flow in an air system for a vehicle.

BACKGROUND

Ventilation systems for vehicles are increasingly complex as the demands on the degree of control of such systems increase. Heating, ventilation and air conditioning (HVAC) systems are typically used to control the environment in a vehicle such that desired interior conditions set by the operator are maintained irrespective of the exterior environment.

Furthermore, it is often desirable to separately control different environmental zones in the vehicle, so that each passenger may adjust the local environment conditions individually. This leads to the development of for example 2-zone and 4-zone HVAC-systems in vehicles.

However, a problem introduced by the increased complexity of the system is that it becomes more difficult to both design and control such systems. In particular, it is desirable to individually control the air flow from each outlet. Traditionally, the system has been modeled using transfer functions developed by measuring combinations of flap position and air flow in a physical model of the system such as a prototype.

As the number of outlets, and flaps, increase, the number of possible combinations increases to the extent that measurements of all relevant combinations become very time consuming. An alternative approach is to use computational fluid dynamics (CFD) calculations to build a model of the system. However, CFD-calculations are both time consuming and computer intensive.

A further disadvantage of the suggested approaches is that each modification or alteration of the system requires new measurements or calculations as the characteristics of one part of the system depend on the whole of the system.

Furthermore, it is desirable to reduce the computational resources required in the vehicle for controlling the system. Accordingly, there is a need for a model of a HVAC-system which is easier to use, both for the purpose of designing such a system and for simplifying control of the system.

SUMMARY

In view of the above-mentioned desired properties of a HVAC system, and the above-mentioned and other drawbacks of the prior art, it is an object of the present disclosure to provide a simplified model for a HVAC system which can be used for designing and controlling such a system.

According to a first aspect of the present disclosure, a method is provided for determining an air flow in a vehicle air conditioning system, the system comprising: at least one inlet; a plurality of outlets; at least one air duct for guiding air from the at least one inlet to the plurality of outlets, each air duct being characterized by a predetermined flow resistance coefficient; at least one flap being characterized by a flow resistance based on a degree of opening of the flap; and a fan for creating an air flow from the at least one inlet to at least one of the plurality of outlets; the method comprising the steps of determining a total equivalent flow resistance $k_{tot}$ between a predetermined location in the system and the interior of the vehicle; wherein flow resistances arranged in series are added to each other and wherein an equivalent flow resistance $k_0$ representing a first flow resistance $k_1$ and a second flow resistance $k_2$ arranged in parallel is determined as:

$$k_0 = \frac{k_1 k_2}{k_1 + k_2 + 2\sqrt{k_1 k_2}}$$

determining a pressure difference P between the predetermined location in the system and the interior of the vehicle; and determining the total air flow F into the interior of the vehicle as $$F = \sqrt{\frac{P}{k_{tot}}}.$$

A flap is here referred to as a controllable air flap which can be fully open, fully closed, or assume any degree of opening there between. The relation between the flow resistance and the degree of opening of the flap is assumed to be known, for example from simulations or measurements.

The inlet may be arranged to introduce air either from outside of the vehicle or from the interior of the vehicle. Alternatively, several inlets may be used to introduce air form different locations.

The present disclosure is based on the realization that by treating components in an air conditioning system as components in an electrical circuit, where a flow resistance is equivalent with an electrical resistance, and a pressure drop is equivalent with a voltage drop, a simplified model of an air conditioning system can be provided. With knowledge of the flow resistance of the system and the pressure drop over the system, the air flow from the system can be calculated. The relation between pressure P, the Resistance R and the flow F can be described as $P=R\times F^2$. The flow resistance R will also be represented by the flow resistance coefficient k. Thereby, the system can be characterized by only a few parameters. In particular, each duct is characterized by a predetermined flow resistance and a flow resistance of a flap depends on the degree of opening of the flap. It should also be noted that a duct may comprise additional elements, such as a heat exchanger, and that the resulting flow resistance for the duct including any additional elements is used.

Accordingly, with knowledge of the flow resistance of ducts and flaps, simple algebra can be used to determine the total flow resistance of the system. Moreover, as the relation between the flap opening degree and the flow resistance is known, the total flow resistance of the system can readily be calculated for different flap settings. Thereby, it is possible to in operation control the air flow into the interior of the vehicle based on the known pressure difference and by controlling flap positions and fan speed.

Furthermore, this approach makes modeling and design of an air conditioning system simpler as it is not required to perform time consuming and computer intensive simulations characterizing the whole of the system for different settings. In particular, for multi-zone HVAC systems, the complexity of the system is rapidly increasing to the point that detailed simulations using methods such as CFD become too time consuming. Instead, in the approach suggested by the present disclosure, CFD calculations can be used to determine the flow resistance of an individual component, such as an air duct having a particular shape. Alternatively, the flow resistance of individual components can be determined by flow measurements. In this way, redesign and modification of the system is simplified as changes or an addition of components does not result in a need to redo calculations for the whole of the system. Instead, it is sufficient to add or replace relevant parameters in the set of equations describing the system. A system characterized by a parameterized model may then be verified by performing flow measurements for the system as a whole.

Through the use of a parameter-based model describing the air conditioning system, less computational resources are required in the vehicle for controlling the system, thereby allowing the use of a less expensive on-board computer, or freeing up computational resources to be used for other tasks.

In one embodiment of the disclosure, the method may further comprise the step of determining an air flow from an outlet based on the total air flow and an equivalent flow resistance between the predetermined location and the outlet. As the total air flow from the outlets can be calculated, the total flow of air into the system is also known as it can be assumed as a first approximation that the total outflow is the same as the inflow. Thereby, the outflow of air from individual outlets can be calculated based on the equivalent flow resistance between the inlet into the system and the particular outlet, and the inflow.

Moreover an air flow $f_1$ from a first duct having a first flow resistance $k_1$, arranged in parallel with a second duct having a second flow resistance $k_2$, can be determined as $$f_1 = \frac{\sqrt{k_2}}{\sqrt{k_1} + \sqrt{k_1}} f_0$$

where $f_0$ is the total mutual inflow to said first and second duct. Thereby, partial flows from any outlet in the system can be determined based on the equivalent flow resistance between the point of inflow and one or more outflows, where the inflow is common for each of the flow paths leading to the outflow.

According to one embodiment of the disclosure, the pressure difference may be determined as the difference between an absolute pressure measured in the interior of the vehicle and an absolute pressure measured at the predetermined location in said system. Separate pressure sensors may be used to measure the pressure in the interior of the vehicle and in the air conditioning system. Alternatively, a differential pressure sensor may be employed which directly measures the relative difference in pressure. However, other methods of determining a pressure difference known by the person skilled in the art may also be utilized.

In one embodiment of the disclosure, the predetermined location may be located between the fan and the at least one air duct. An air conditioning system for a vehicle generally comprises several components arranged between the inlet and the air ducts used to distribute air to different outlets. Such components may include a fan, filters for cleaning the air and an evaporator for cooling air. Accordingly, in order to determine the pressure difference over the portion of the system distributing the air, i.e., the ducts and flaps, the predetermined location may preferable be located between the fan and the first air duct. If applicable, the predetermined location may also be located after the filter and the evaporator.

Furthermore, in one embodiment of the disclosure, the pressure at a predetermined location of the system may be determined based on a vehicle speed and fan speed. As the air flow through an inlet into the air conditioning system is influenced by the vehicle speed, the pressure within the system is likewise influenced. Furthermore, a pressure at a location in the system after the fan is also influenced by the speed of the fan. Thereby, by knowing the relation between vehicle speed and air flow through the inlet, and by knowing the relation between the speed of the fan and the resulting air flow after the fan, the pressure at a location after the fan can be calculated.

According to one embodiment of the disclosure, a predetermined flow resistance for at least one air duct and/or flap can be adjusted based on a temperature. As the viscosity of air is temperature dependent, the mass flow is temperature dependent. In order to avoid complicated flow calculations, the temperature dependence of the mass flow can be approximated by a temperature dependent flow resistance. Thereby, a more accurate equivalent flow resistance can be determined which also take temperature variations into account.

According to one embodiment of the disclosure, the method may further comprise controlling the fan speed and the degree of opening of at least one flap such that a predetermined air flow is achieved through each of the plurality of outlets. The disclosed method may advantageously be used in a control system where knowledge of the relation between pressure, flow resistance and air flow in the system is used to control the outflow of air from separate outlets such that desired conditions set by an operator is maintained, even if external parameters such as vehicle speed or temperature changed.

In one embodiment of the disclosure, the method may further comprise controlling an actuator connected to a flap for controlling a degree of opening of the flap. The actuator may for example be a stepper motor or a DC-motor.

According to a second aspect of the disclosure, there is provided an air conditioning system for a vehicle, the system comprising: at least one inlet; a plurality of outlets; at least one air duct configured to guide air from the at least one inlet to the plurality of outlets, each air duct being characterized by a predetermined flow resistance coefficient; at least one flap being characterized by a flow resistance based on a degree of opening of the flap; a controllable fan for creating an air flow from the at least one inlet to at least one of the plurality of outlets; a control unit configured to: determine a total equivalent flow resistance between a predetermined location in the system and the interior of the vehicle; wherein flow resistances arranged in series are added to each other and wherein an equivalent flow resistance $k_0$ representing a first flow resistance $k_1$ and a second flow resistance $k_2$ arranged in parallel is determined as:

$$k_0 = \frac{k_1 k_2}{k_1 + k_2 + 2\sqrt{k_1 k_2}};$$

determine a pressure difference between the predetermined location in the system and the interior of the vehicle; and control the total air flow into the interior of the vehicle by controlling the fan and the degree of opening of the at least one flap.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

In one embodiment of the disclosure, the air conditioning system may further comprise a recirculation flap arranged between an interior of the vehicle and the system and configured to control the amount of air in the vehicle being re-circulated by the air conditioning system.

According to one embodiment of the disclosure, the air conditioning system may further comprise a differential pressure sensor configured to measure the pressure difference between the predetermined location in the system and the interior of said vehicle.

Effects and features of this second aspect of the present disclosure are largely analogous to those described above in connection with the first aspect of the disclosure.

Further features of, and advantages with, embodiments according to the present disclosure will become apparent when studying the appended claims and the following description. The skilled person will realize that different features of the present disclosure may be combined to create embodiments other than those described in the following, without departing from the scope of the present disclosure.

BRIEF DESCRIPTION OF THE DRAWINGS

These and other aspects of the present disclosure will now be described in more detail with reference to the appended drawings showing an example embodiment of the disclosure, wherein.

DETAILED DESCRIPTION

In the present detailed description, various embodiments of a vehicle air conditioning system and a method for determining an air flow in such a system according to the present disclosure are discussed. It should be noted that this by no means limits the scope of the present disclosure which is also applicable to air distribution systems in general as well as to pneumatic and hydraulic systems.

Figure 1:
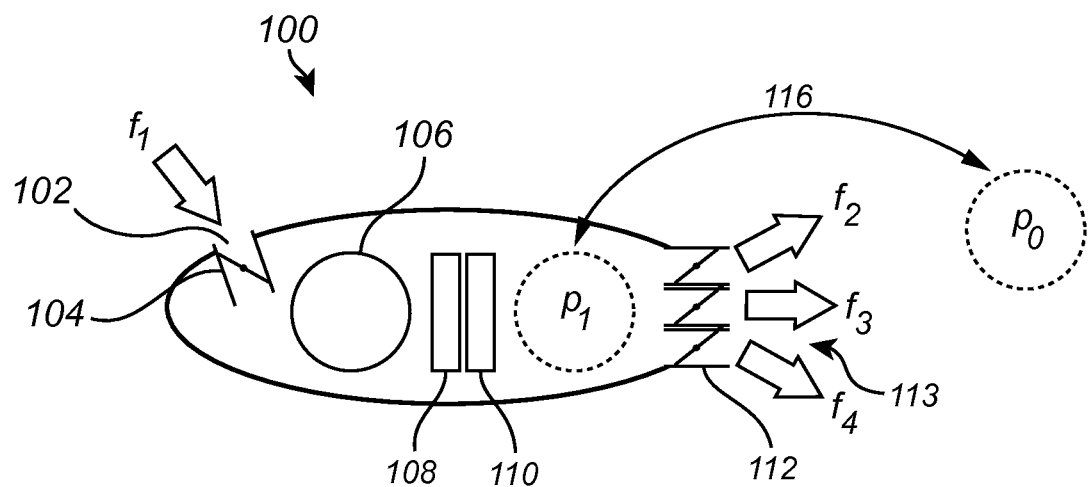
FIG. 1 schematically illustrates a HVAC-system according to an embodiment of the disclosure.

FIG. 1 is schematic illustration of an HVAC-system 100 having an inlet 102 an inlet flap 104 for regulating the inflow $f_1$ of air into the system 100, a fan 106 for controlling the air flow in the system, a filter 108 for filtering the air, an evaporator 110 for cooling the air and a HVAC-unit 112 for tempering the air flow to one or more temperature zones and for distributing air to different outlets, $f_2$, $f_3$, $f_4$. The HVAC-unit 112 typically comprises a plurality of ducts, flaps and outlets 113. The pressure at a point between the evaporator 110 and the inlet of the HVAC-unit 112 is designated $p_1$, and $p_0$ is the pressure after the HVAC-unit 112. The relation between pressure P, the resistance R and the flow F can be described as $P=R\times F^2$. By determining the pressure drop P over the HVAC-unit as $P=p_1-p_0$, the total flow F can be determined as $F=\sqrt{P/R}$. The flow into the system, $f_1$, depends on the degree of opening of the inlet flap 104, and where the system is arranged in a moving vehicle, on the speed of the vehicle. The flow into the system also depends on the operating conditions of the fan 106. An HVAC-system may also comprise a heater core, which typically is arranged after the evaporator, so that hot and cold air may be mixed in order to achieve desirable temperatures from a selected outlet. A heater can be characterized by its flow resistance in the same manner as other components in the system.

FIGS. 2a-e describe how to characterize different components in the HVAC-unit 112 in order to form a model describing the characteristics of the entire HVAC-unit 112 so that partial air flows can be determined. In particular, FIG. 2 illustrates how the equivalent flow resistance of different components or combinations of components can be determined based on the flow resistance coefficients of each component so that partial air flows from the system can be calculated.

Figure 2A:
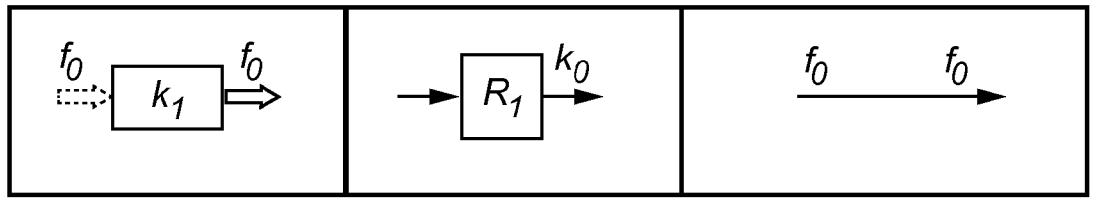
FIGS. 2a-e schematically illustrate the characteristics of components in a HVAC-system.

FIG. 2a illustrates a single duct which is characterized only by its flow resistance $k_1$, thus having an outflow equal to the inflow $f_0$. A duct is used to represent a component having a constant flow resistance, it should be understood that other components also may be characterized by a constant flow resistance. Furthermore, in a block model of the system, the flow resistance is represented by a block R.

Figure 2B:
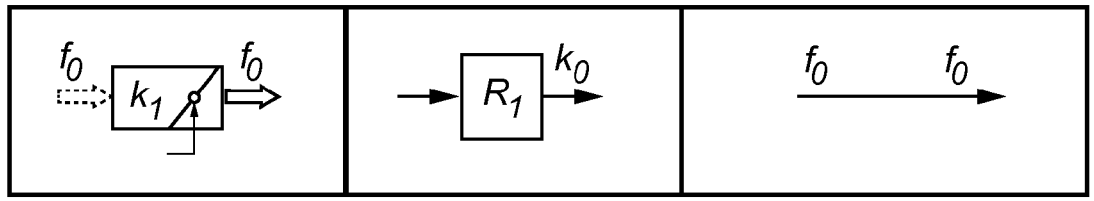

FIG. 2b illustrates a flap having a variable flow resistance $k_1$ which depends on the degree of opening of the flap. The flow resistance for the flap is represented by a block R for a given position of the flap. The relation between the flow resistance and the degree of flap opening is proportional to $(1/A)^2$ where A is the opening area of the flap for a given position.

Figure 2C:
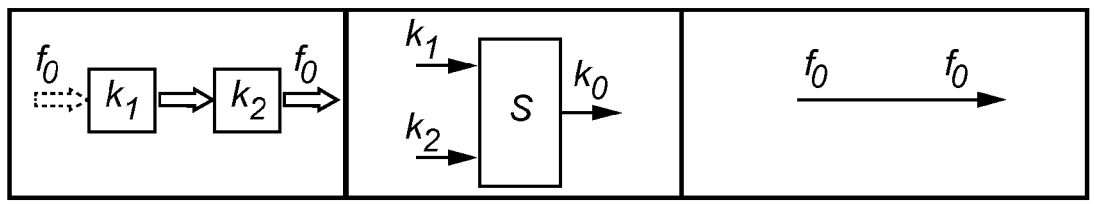

FIG. 2c illustrates two ducts arranged in series having flow resistances $k_1$ and $k_2$ where the total flow resistance $k_0$ is the sum of the two flow resistances, $k_0=k_1+k_2$. The block S represents the summation of two flow resistances.

Figure 2D:
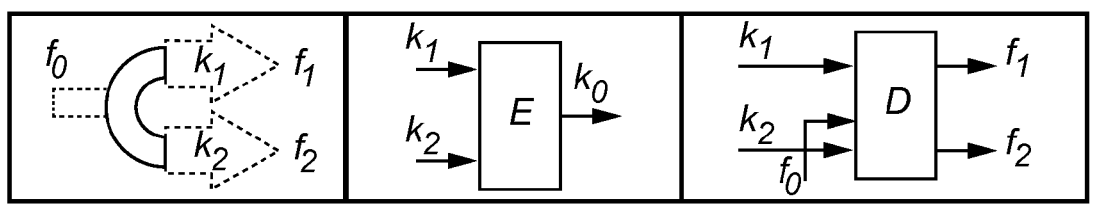

FIG. 2d illustrates two ducts arranged in parallel having flow resistances $k_1$ and $k_2$. The equivalent flow resistance $k_0$ is determined as $$k_0 = \frac{k_1 k_2}{k_1 + k_2 + 2\sqrt{k_1 k_2}}.$$

The block E represents the equivalent flow resistance of two flow resistances arranged in parallel. Furthermore, the distribution of the air flow through the two ducts can be determined as the partial flows $f_1$ and $f_2$ calculated as $$f_1 = \frac{\sqrt{k_2}}{\sqrt{k_1} + \sqrt{k_1}} f_0 \text{ and } f_2 = \frac{\sqrt{k_1}}{\sqrt{k_1} + \sqrt{k_1}} f_0.$$

The block D represents the distribution of partial air flows for ducts arranged in parallel. In block D, the partial outflow from each duct can be calculated using the total inflow and flow resistance of each path. Furthermore, the equivalent flow resistance for a two-way passage where hot and cold air is mixed can be seen as two ducts arranged in parallel, where the two ducts have a common inlet and a common outlet.

Figure 2E:
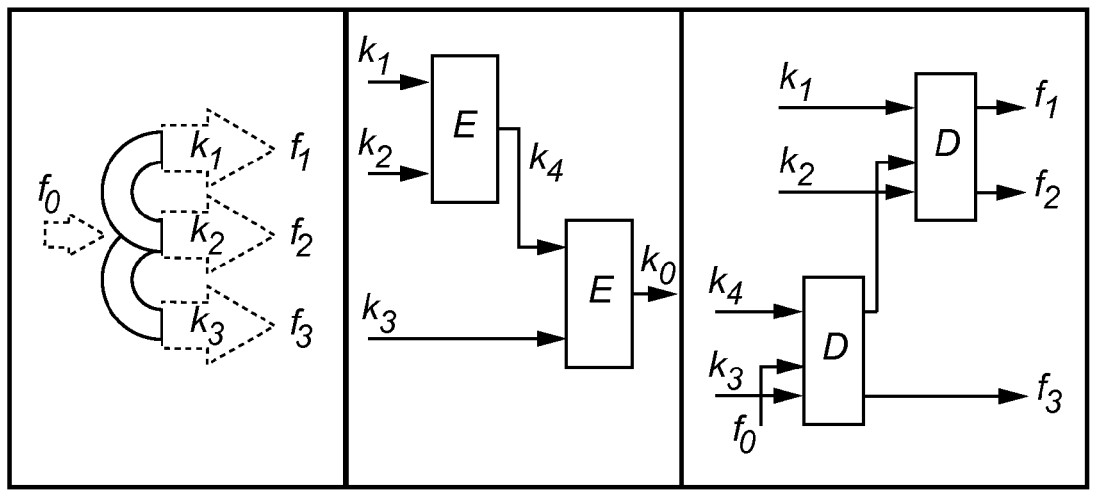

FIG. 2e finally illustrates the case where three ducts having flow resistances $k_1$, $k_2$ and $k_3$ are arranged in parallel. First, the equivalent flow resistance $k_4$ for two of the ducts $k_1$ and $k_2$ is determined in the same manner as in FIG. 2d. Next, the total equivalent flow resistance of the three ducts is determined as the flow resistance $k_4$ in parallel with $k_3$. Similarly, the partial flows $f_1$, $f_2$ and $f_3$ can be determined analogously using the flow distribution blocks D as described in relation to FIG. 2d.

Based on the above-mentioned building blocks R, S, E and D, an arbitrary HVAC system comprising any number of components can be formed, characterized by the introduced building blocks, and the resulting partial flows can be determined. In practice, blocks are used to transform the different parts of the system into a model describing the overall properties of the system.

Once a theoretical model has been formed based on known properties of the components, the model can be verified in a real system by measuring partial flows using flow sensors. The model can also be verified by using CFD calculations characterizing the model, or parts of the model.

Accordingly, the problem of calculating flow paths in the system is divided into two parts. First, the system flow resistance is calculated, using blocks R, E and S, based on the known flow resistance coefficients of the parts of the system and of the degree of opening of each flap. Next, the system flow paths and partial flow from each outlet is calculated using block D and the total inflow. Thereby, a parameterized model is formed which may be used for determining characteristics of the system during a design phase. As is readily realized by the person skilled in the art, the model is equally well suited for controlling the system during use. With knowledge of desired air flows from each outlet, the required flap positions and total inflow can be calculated.

Figure 3:
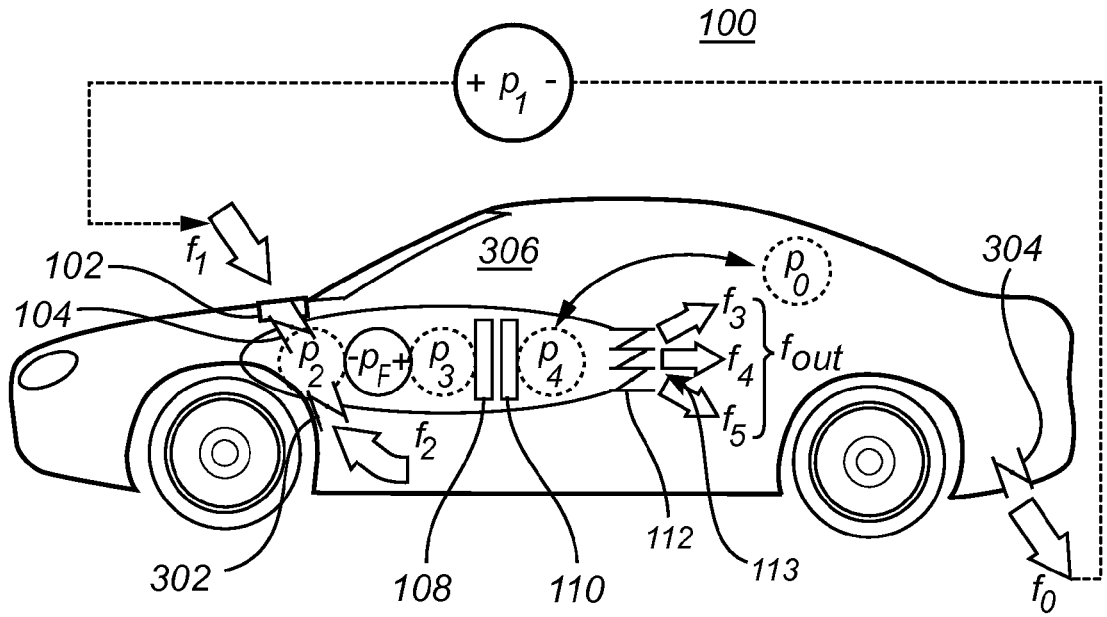
FIG. 3 schematically illustrates a HVAC-system in a vehicle according to an embodiment of the disclosure.

FIG. 3 illustrates the HVAC-system 100 of FIG. 1 arranged in a vehicle. The system further comprises a recirculation flap 302 and an evacuation flap 304. The recirculation flap controls the recirculation air flow and the evacuation flap balances the intake of air flow $f_1$. The air flow $f_1$ is correlated with the vehicle's ram pressure which in turn depends on the speed and the design of the vehicle. The outflows of the system, i.e. $f_3$, $f_4$, and $f_5$, are thus affected by the pressure $p_2$, the resulting equivalent pressure $p_3$ which is a function of the fan characteristics and the fan speed, and by the flow resistance in the filter 108, the evaporator 110 and in the HVAC-unit 112.

Figure 4:
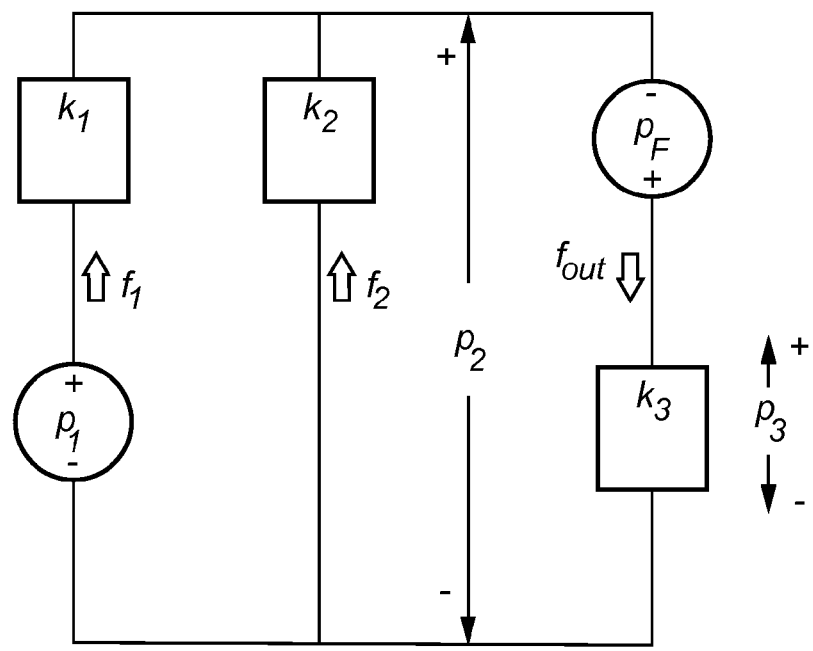
FIG. 4 is a simplified model of a HVAC-system in a vehicle.

In order to achieve good ventilation in the vehicle compartment 306, a regulator can control the outflow, $f_{out}=f_3+f_4+f_5$, with respect to a set point. One way to calculate the air flow $f_{out}$ is to use an equivalent diagram of the system. A reduced total flow model is shown in FIG. 4 where $k_1$ is the equivalent flow resistance of the evacuation flap 304, the inlet 102 and the inlet flap 104, $k_2$ is the equivalent flow resistance of the recirculation flap 304 and $k_3$ is the equivalent flow resistance of the fan 106, the filter 108, the evaporator 110 and the HVAC-unit 112. The reference pressure is designated $p_0$.

The flow resistance $k_3$ is determined by the desired air temperatures of one or more temperature zones in the vehicle compartment 306 and the desired air distribution to different parts of the vehicle compartment via air ducts.

By using the reduced total flow model of FIG. 4 the air flow $f_{out}$ can be determined for various conditions provided that the characteristics of the fan are known.

Figure 5:
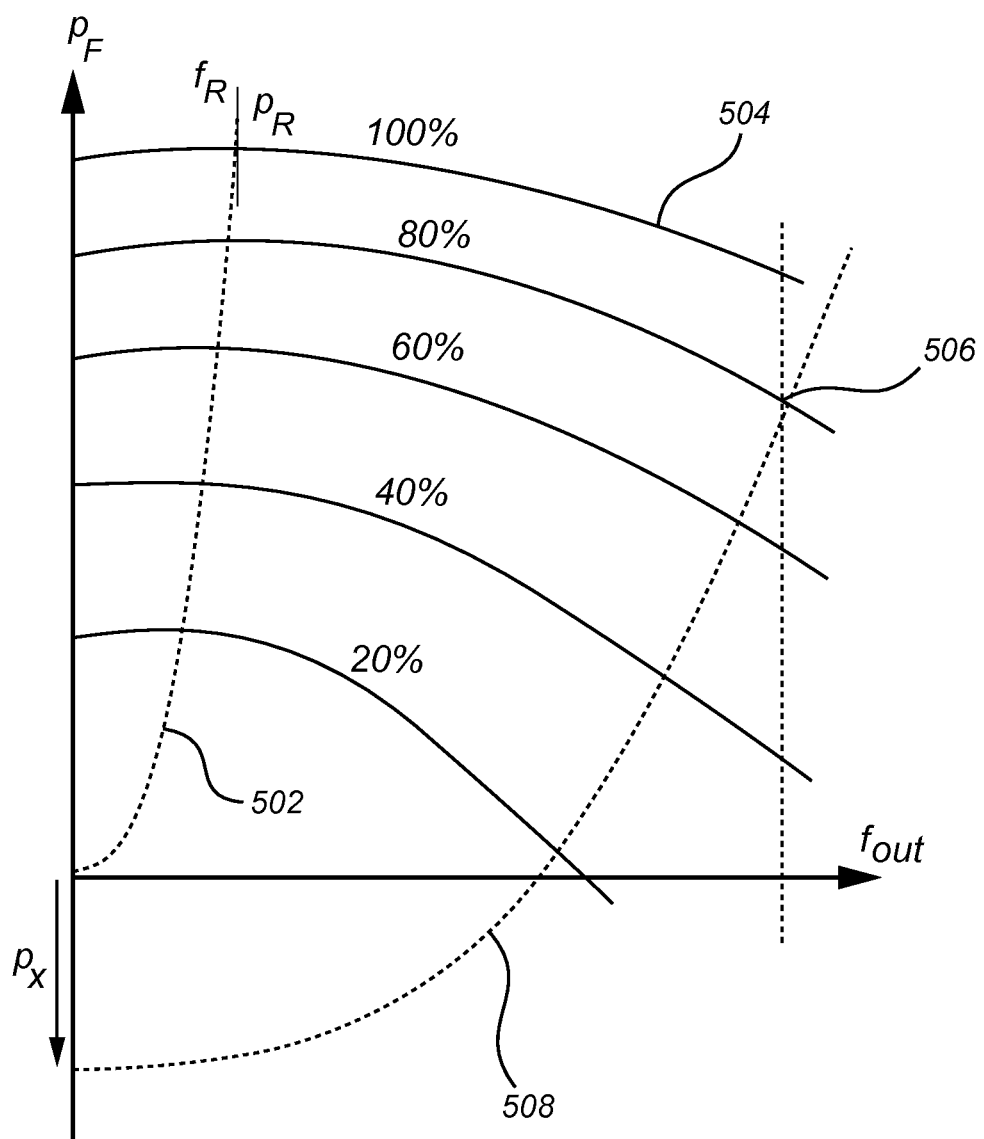
FIG. 5 is a diagram for determining a working point of a fan.

The fan characteristic $p_F$ can be written as a function of the rpm of the fan and the flow $f_{out}$. In many cases, the characteristic can be described analytically. An approximation of $p_F$ can be written as $p_F=p_0-k_R(f_{out}-f_0)^2$, illustrated by curve 508 in FIG. 5, where $k_R$ is the fan pressure coefficient at reference speed of the fan wheel rpm$_R$, $$f_0 = f_R \left( \frac{rpm}{rpm_R} \right)^2$$

where rpm$_R$ is the reference speed of the fan wheel, and $$p_0 = f_0 \frac{p_R}{f_R^2}$$

where $p_R$ is a reference pressure and $f_R$ is the reference flow at the reference speed of the fan wheel rpm$_R$. The working point can be found from FIG. 5 where $p_x$ is additional pressure (e.g. $p_2$) in the flow path and $k_x$ is the sum of flow resistance for the equivalent flow path. The curve 502 in FIG. 5 represents $$f_0 = f_R \left( \frac{rpm}{rpm_R} \right)^2,$$

curve 504 represents $p_F=k_x \times f_{out}^2-p_x$, and point 506 represents the Working Point for $p_F$ at 80% of rpm$_R$, $p_x$ and $k_x$. Here, px represent different conditions. In particular, in FIG. 5, $p_x$ is equal to $p_2$.

With knowledge of the fan characteristics, the following conditions can be determined:

1) Calculation of airflow $f_{out}$ with no recirculating air:

In the case where no recirculating air is present ($f_2=0$) the calculation of the air flow $f_{out}$ can be simplified to $$f_{out} = \sqrt{\frac{p_1 + p_F}{k_1 + k_3}},$$

where $p_1$ and $p_F$ are assumed to be positive. For a fan described above, the working point can be calculated with use of $$\begin{cases} f_{out} = \frac{k_R f_0}{k_R + k_1 + k_3} + \sqrt{\left(\frac{k_R f_0}{k_R + k_1 + k_3}\right)^2 + \left(\frac{p_0 + p_1}{k_R + k_1 + k_3}\right) - \left(\frac{k_R f_0^2}{k_R + k_1 + k_3}\right)} \\ p_F = k_{HVAC} * f_{out}^2 - p_1 \end{cases},$$

where the variables $k_R$, $p_0$ and $f_0$ refer to the calculation of the fan characteristic and $k_{HVAC}$ is the equivalent flow resistance of the HVAC-unit. The flow $f_3$ can be controlled by controlling $k_1$ and $p_F$.

2) Calculation of airflow $f_{out}$ with no outside air, $p_x=0$:

In the case when no outside air is present ($f_1=0$) the calculation of the air flow $f_{out}$ simplifies to $$f_{out} = \sqrt{\frac{p_F}{k_2 + k_3}}$$

where $p_F$ is assumed to be positive.

For a fan described above the working point can be calculated with use of $$\begin{cases} f_{out} = \frac{k_R f_0}{k_R + k_2 + k_3} + \sqrt{\left(\frac{k_R f_0}{k_R + k_2 + k_3}\right)^2 + \left(\frac{p_0}{k_R + k_2 + k_3}\right) - \left(\frac{k_R f_0^2}{k_R + k_2 + k_3}\right)} \\ p_F = k_{HVAC} * f_{out}^2 \end{cases}$$

The flow $f_3$ can be controlled by controlling $k_2$ and $p_F$.

3) Calculation of airflow $f_3$ when mixing the outside air and the recirculated air, $p_x = p_2$:

In the case when the outside air ($f_1 > 0$) and the recirculation air ($f_2 > 0$) is present, the calculation is dependent of the pressure over the recirculation flap ($p_2$). For this scenario there are two possible cases, $$p_1 < p_F \frac{k_1}{k_3} \quad \text{Case 1}$$

In the first case where $$p_1 < p_F \frac{k_1}{k_3},$$

it is ensured that the pressure $p_2 < 0$. By using this, the flows can be defined as $$f_2 = f_{out} - f_1$$

$$f_{out} = \sqrt{\frac{p_2 + p_F}{k_3}}, \text{ where } p_2 + p_F \geq 0.$$

$$f_1 = \sqrt{\frac{p_1 - p_2}{k_1}}, \text{ where } p_1 \geq p_2.$$

$$f_2 = \sqrt{\frac{-p_2}{k_2}}, \text{ where } p_2 < 0.$$

Solving the equations when $$p_1 < p_F \frac{k_1}{k_3}$$

gives the solution $$c = p_F^2 k_1^2 k_2^2 - 2 p_F p_1 k_1 k_2^2 k_3 + p_1^2 k_2^2 k_3^2$$

$$b_1 = (+) 2 k_1 k_2 k_3^2 - 2 k_1 k_2^2 k_3 - 2 k_2^2 k_3^2$$

$$b_F = (+) 2 k_1^2 k_2 k_3 + 2 k_1^2 k_2^2 + 2 k_1 k_2^2 k_3$$

$$a = k_1^2 k_2^2 + 2 k_1 k_2^2 k_3 + k_2^2 k_3^2 - (+) 2 k_1 k_2 k_3^2 + k_1^2 k_3^2 + (+) 2 k_1^2 k_2 k_3$$

$$p_2 = \left(-\frac{b_F * p_F}{2a}\right) + \left(-\frac{b_1 * p_1}{2a}\right) + (+) \sqrt{\left(\left(-\frac{b_F * p_F}{2a}\right) + \left(-\frac{b_1 * p_1}{2a}\right)\right)^2 - \frac{c}{a}}$$

For a fan described above, the working point can be calculated with use of $$\begin{cases} f_{out} = \frac{k_R f_0}{k_R + k_3} + \sqrt{\left(\frac{k_R f_0}{k_R + k_3}\right)^2 + \left(\frac{p_0 + p_2}{k_R + k_3}\right) - \left(\frac{k_R f_0^2}{k_R + k_3}\right)} \\ p_F = k_{HVAC} * f_{out}^2 - p_2 \end{cases}$$

The flow $f_{out}$ can be controlled by controlling $k_1$, $k_2$ and $p_F$. Similarly, a regulator can control the air mixture of $f_1$ and $f_2$ by controlling $k_1$, $k_2$ and $p_F$.

$$p_1 \geq p_F \frac{k_1}{k_3} \quad \text{Case 2}$$

In the case where $$p_1 \geq p_F \frac{k_1}{k_3},$$

there is a backflow for the recirculated air flow. By using this, the flows can be defined as $$f_2 = f_{out} - f_1$$

$$f_{out} = \sqrt{\frac{p_2 + p_F}{k_3}}, \text{ where } p_2 + p_F \geq 0.$$

$$f_1 = \sqrt{\frac{p_1 - p_2}{k_1}}, \text{ where } p_1 \geq p_2.$$

$$f_2 = -\sqrt{\frac{p_2}{k_2}}, \text{ where } p_2 \geq 0.$$

Solving the equations when $$p_1 \geq p_F \frac{k_1}{k_3}$$

gives the solution $$c = p_F^2 k_1^2 k_2^2 - 2 p_F p_1 k_1 k_2^2 k_3 + p_1^2 k_2^2 k_3^2$$

$$b_1 = (-) 2 k_1 k_2 k_3^2 - 2 k_1 k_2^2 k_3 - 2 k_2^2 k_3^2$$

$$b_F = (-) 2 k_1^2 k_2 k_3 + 2 k_1^2 k_2^2 + 2 k_1 k_2^2 k_3$$

$$a = k_1^2 k_2^2 + 2 k_1 k_2^2 k_3 + k_2^2 k_3^2 - (-) 2 k_1 k_2 k_3^2 + k_1^2 k_3^2 + (-) 2 k_1^2 k_2 k_3$$

$$p_2 = \left(-\frac{b_F * p_F}{2a}\right) + \left(-\frac{b_1 * p_1}{2a}\right) + (-) \sqrt{\left(\left(-\frac{b_F * p_F}{2a}\right) + \left(-\frac{b_1 * p_1}{2a}\right)\right)^2 - \frac{c}{a}}$$

For a fan described above, the working point can be calculated with use of $$\begin{cases} f_{out} = \frac{k_R f_0}{k_R + k_3} + \sqrt{\left(\frac{k_R f_0}{k_R + k_3}\right)^2 + \left(\frac{p_0 + p_2}{k_R + k_3}\right) - \left(\frac{k_R f_0^2}{k_R + k_3}\right)} \\ p_F = k_{HVAC} * f_{out}^2 - p_2 \end{cases}$$

In particular, it is desirable to avoid backflow in the system, for example so that air does not leave the vehicle through the inlet 102. To avoid backflow in the system, a regulator can control $k_1$, $k_2$ and $p_F$.

Even though the invention has been described with reference to specific exemplifying embodiments thereof, many different alterations, modifications and the like will become apparent for those skilled in the art. For example, the model may be used in other systems for calculating flows. Also, it should be noted that parts of the system may be omitted, interchanged or arranged in various ways.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Additionally, the features of various implementing embodiments may be combined to form further embodiments of the invention.

What is claimed is:

1. A method for determining an air flow in a vehicle air conditioning system, wherein the system comprises at least one inlet; a plurality of outlets; at least one air duct for guiding air from the at least one inlet to the plurality of outlets, each air duct having a predetermined flow resistance coefficient; at least one flap having a flow resistance based on a degree of opening of the at least one flap; and a fan for creating an air flow from the at least one inlet to at least one of the plurality of outlets; the method comprising:
   determining a total equivalent flow resistance $k_{tot}$ between a predetermined location in the system and an interior of the vehicle, wherein flow resistances arranged in series are added to each other and wherein an equivalent flow resistance $k_0$ representing a first flow resistance $k_1$ and a second flow resistance $k_2$ arranged in parallel is determined as:

$$k_0 = \frac{k_1 k_2}{k_1 + k_2 + 2\sqrt{k_1 k_2}};$$

determining a pressure difference P between the predetermined location in the system and the interior of the vehicle; and
   determining total air flow F into the interior of the vehicle as $$F = \sqrt{\frac{P}{k_{tot}}}.$$

2. The method according to claim 1 further comprising determining an air flow from an outlet based on the total air flow and an equivalent flow resistance between the predetermined location and the outlet.

3. The method according to claim 1 wherein an air flow $f_1$ from a first duct having a first flow resistance $k_1$, arranged in parallel with a second duct having a second flow resistance $k_2$, is determined as $$f_1 = \frac{\sqrt{k_2}}{\sqrt{k_1} + \sqrt{k_1}} f_0$$

where $f_0$ is total inflow to the first and second ducts.

4. The method according to claim 1 wherein the pressure difference is determined as the difference between an absolute pressure measured in the interior of the vehicle and an absolute pressure measured at the predetermined location in the system.

5. The method according to claim 1 wherein pressure at a predetermined location of the system is determined based on a vehicle speed and fan speed.

6. The method according to claim 1 wherein the predetermined location is located between the fan and the at least one air duct.

7. The method according to claim 1 wherein a predetermined flow resistance for the at least one air duct and/or the at least one flap is adjusted based on a temperature.

8. The method according to claim 1 further comprising controlling fan speed and the degree of opening of the at least one flap such that a predetermined air flow is achieved through each of the plurality of outlets.

9. The method according to claim 1 further comprising controlling an actuator connected to one of the at least one flap for controlling a degree of opening of the one flap.

10. An air conditioning system for a vehicle, the system comprising:
    at least one inlet;
    a plurality of outlets;
    at least one air duct configured to guide air from the at least one inlet to the plurality of outlets, each air duct having a predetermined flow resistance coefficient;
    at least one flap having a flow resistance based on a degree of opening of the at least one flap;
    a controllable fan for creating an air flow from the at least one inlet to at least one of the plurality of outlets; and
    a control unit configured to:
      determine a total equivalent flow resistance between a predetermined location in the system and an interior of the vehicle, wherein flow resistances arranged in series are added to each other and wherein an equivalent flow resistance $k_0$ representing a first flow resistance $k_1$ and a second flow resistance $k_2$ arranged in parallel is determined as:

$$k_0 = \frac{k_1 k_2}{k_1 + k_2 + 2\sqrt{k_1 k_2}};$$

determine a pressure difference between the predetermined location in the system and the interior of the vehicle; and
      control total air flow into the interior of the vehicle by controlling the fan and the degree of opening of the at least one flap.

11. The air conditioning system according to claim 10 further comprising a recirculation flap arranged between an interior of the vehicle and the system, and configured to control amount of air in the vehicle being re-circulated by the air conditioning system.

12. The air conditioning system according to claim 10 further comprising a differential pressure sensor configured to measure the pressure difference between the predetermined location in the system and the interior of the vehicle.

13. The air conditioning system according to claim 11 wherein the control unit is further configured to determine an air flow $f_1$ from a first duct having a first flow resistance $k_1$, arranged in parallel with a second duct having a second flow resistance $k_2$, as $$f_1 = \frac{\sqrt{k_2}}{\sqrt{k_1} + \sqrt{k_1}} f_0$$

where $f_0$ is total inflow to the first and second ducts.

14. A method for determining an air flow in an air conditioning system for a vehicle, the method comprising:
  determining a total equivalent flow resistance $k_{tot}$ between a predetermined location in the system and an interior of the vehicle, wherein flow resistances arranged in series are added to each other and wherein an equivalent flow resistance $k_0$ representing a first flow resistance $k_1$ and a second flow resistance $k_2$ arranged in parallel is determined as:

$$k_0 = \frac{k_1 k_2}{k_1 + k_2 + 2\sqrt{k_1 k_2}};$$

determining a pressure difference P between the predetermined location in the system and the interior of the vehicle; and
  determining total air flow F into the interior of the vehicle as $$F = \sqrt{\frac{P}{k_{tot}}}.$$

* * * * *